United States Patent [19]
Lundstrom

[11] Patent Number: 5,108,066
[45] Date of Patent: Apr. 28, 1992

[54] HAND RELEASABLE LOCKING COLLAR

[76] Inventor: Donald A. Lundstrom, 661 Grove St., Worcester, Mass. 01605

[21] Appl. No.: 508,552

[22] Filed: Apr. 13, 1990

[51] Int. Cl.5 .................... A44B 21/00; F16M 11/00
[52] U.S. Cl. .................................. 248/410; 24/649; 24/524; 285/902
[58] Field of Search ............... 24/649, 650, 522, 524, 24/270, 488; 403/104, 318, 373, 374; 248/410, 245; 285/902

[56] References Cited

U.S. PATENT DOCUMENTS

| | | | |
|---|---|---|---|
| 506,716 | 10/1893 | McNellis | 24/522 |
| 836,303 | 11/1906 | Christensen | 248/410 |
| 1,203,071 | 10/1916 | Straub | 248/410 |
| 1,702,359 | 2/1929 | Molmark | 24/522 |
| 2,090,550 | 8/1937 | Pilblad | 248/410 |
| 3,402,947 | 9/1968 | Lewis | 248/410 |
| 4,261,601 | 4/1981 | Sloan | 285/902 |
| 4,545,618 | 10/1985 | Kitamura | 248/410 |
| 4,646,398 | 3/1987 | Myhrman | 24/524 |

FOREIGN PATENT DOCUMENTS

| | | | |
|---|---|---|---|
| 0717875 | 9/1965 | Canada | 285/902 |
| 0462560 | 10/1968 | Switzerland | 285/902 |
| 0284564 | 2/1928 | United Kingdom | 285/902 |

Primary Examiner—Victor N. Sakran
Attorney, Agent, or Firm—Bromberg & Sunstein

[57] ABSTRACT

A hand releasable locking collar to secure objects or itself in a desired location on a shaft, bar or the like. The device comprises a housing, end cap, preload spring and clutch plate conformed to the shaft. The clutch plate is rotatably assembled within the device such that said device is free to move axially on the shaft when the clutch plate is positioned perpendicular to the axis of the shaft. When released, said clutch plate allows further tightening of the device by moving axially in the direction installed, but locks positively to prevent removal or movement in the opposite direction unless such clutch plate is again moved to the position of perpendicularity with the axis of the shaft.

5 Claims, 5 Drawing Sheets

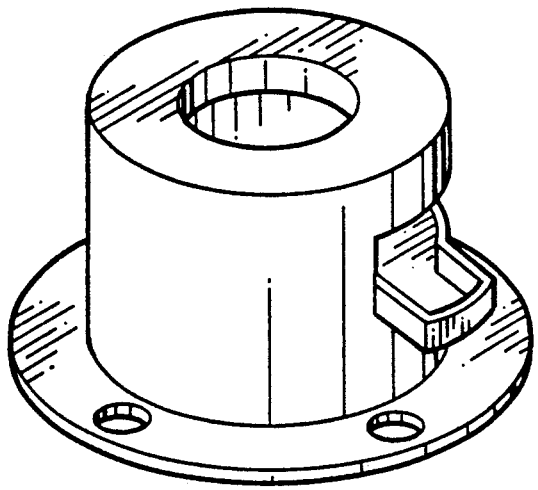
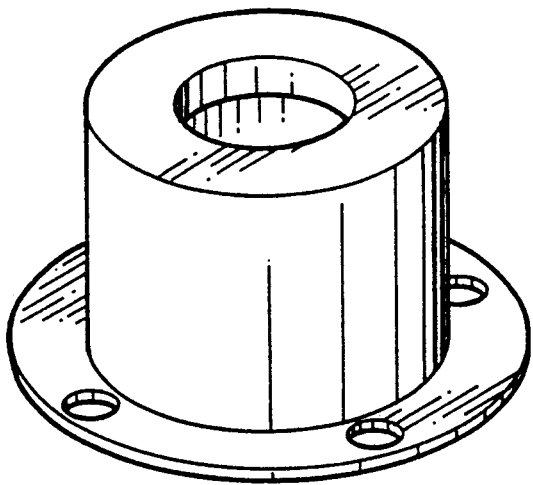
FIG. 5A   FIG. 5B
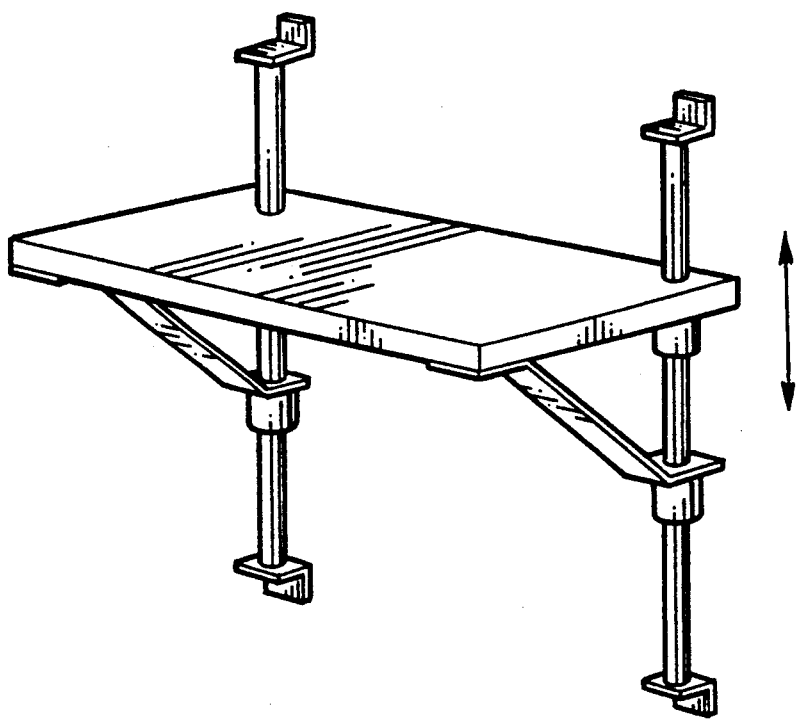
FIG. 5C

HAND RELEASABLE LOCKING COLLAR

BACKGROUND OF THE INVENTION

1. Field of the Invention

This invention relates in general to techniques for securing objects on shafts and in particular to techniques that allow removal or change in position without the use of tools.

2. Description of the Prior Art

There are many situations where it is desirable to secure objects in a given position on a shaft of given cross section quickly, securely, and without the use of tools. One such application is the ability to secure free weights on a barbell for weightlifting.

The Myhrman U.S. Pat. No. 4,646,398 shows a rotatably connected locking ring but requires costly machining techniques to manufacture. Also, locking ring radial clearance around the bar and the cam action of the locking lever need to be accurately determined for safe and positive locking action. Variations in shaft diameter are not easily accommodated.

The Polson U.S. Pat. No. 4,639,979 shows a radially operating clamping collar which uses a frictional material to avoid slipping on the bar. The clamp design does not allow for adjustment due to variation in bar diameter nor does it adjust to compensate for wear or variations in coefficient of friction of the lining material.

The Gall U.S. Pat. No. 4,585,367 shows a complicated and more costly arrangement of gear shapes which are not suited for use on the many barbells already in use or manufactured and in inventory available for sale.

The Weider U.S. Pat. No. 4,569,105 shows a spring-type weight retention device with a locking lever. This configuration does not readily adapt to changes in bar diameter, and the retention force is of fixed value for the given fit of spring device to bar. The force tending to push the weights off the end of the bar can eventually be increased to the point of sliding the spring clamp off the bar.

The Gogarty U.S. Pat. No. 4,529,197 shows a complex arrangement of machined parts which are not suited to barbells already in use or manufactured for sale.

The Miles U.S. Pat. No. 4,738,446 shows a complex arrangement of machined parts which are not suited to barbells already in use or manufactured for sale.

The Holman U.S. Pat. No. 2,815,778 Uses the concept of more than one "key" or tilting lock plate to secure a movable jaw on a frame. The very basic design of the lock plates makes it necessary to use multiple pieces and make them relatively long for proper locking and release.

SUMMARY OF THE INVENTION

An object of this invention is to provide a method of easily and safely securing objects on a shaft.

A more specific object is to retain barbell weights on a barbell during exercise.

Another object is to act as a guide and locking device for locating objects such as shelves, work surfaces, or machine members and then holding them securely in position.

Still another object is to achieve a design for this device which will provide a retaining capability that increases in proportion to the force attempting to remove the object.

A further object is to use materials and construction that permits a device which is both durable as well as economical to produce.

The foregoing objects can be accomplished by a rotatably mounted plate containing a central opening with a plurality of projections to contact a bar or shaft passing through this central opening. Adjacent to this plate is a spring which is positioned to rotate said plate into full contact with the bar or shaft. Both the plate and the spring are maintained in correct preloaded position by the retaining cap which is pressed into the end of the outer housing.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 5A shows a top perspective of and end flange mounting for a locking collar.

FIG. 5B is a top perspective end flange mounting for a non-locking collar.

FIG. 5C is a top perspective of a movable shelf which can be locked in various positions using locking and non-locking collars.

DESCRIPTION OF THE PREFERRED EMBODIMENTS

Figure 1:
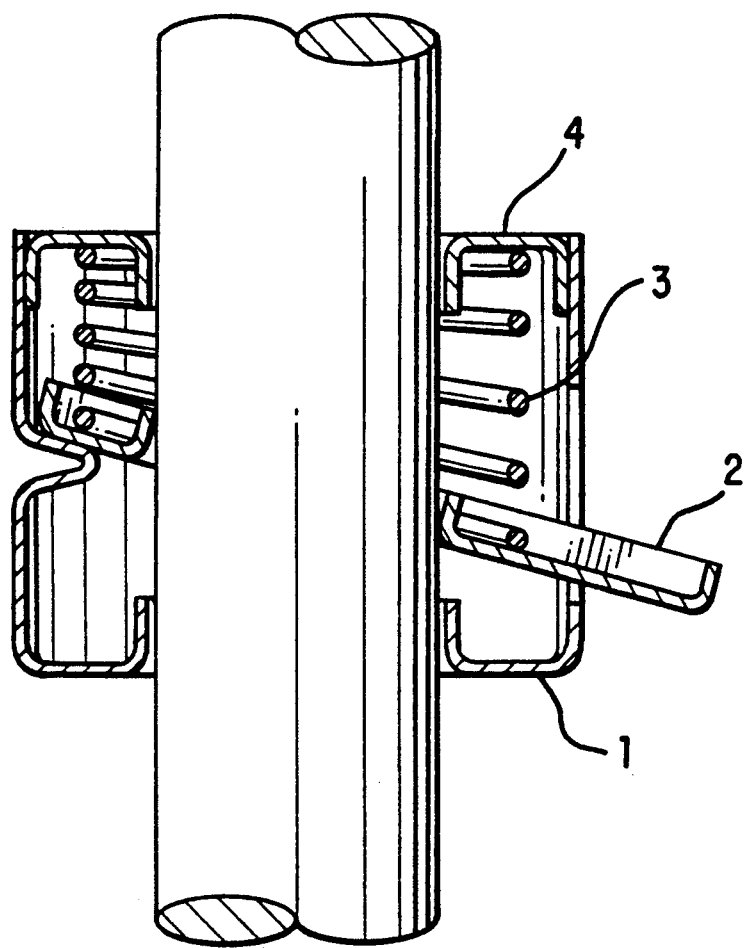
FIG. 1 is a cut-way view of the device.

As shown in the drawings, the preferred locking collar in accordance with the present invention includes a housing 1 which is made in such a manner that the large upper opening will accept the cap 4 and that the lower opening will be formed inward to create a surface that will guide the bar passing through its center and provide an area for the resulting sliding contact.

The housing also contains a projection on which the clutch plate 2 pivots for its locking action. Opposite the projection is an opening in the side of the housing which provides lateral guiding and vertical travel for the handle portion of the clutch plate.

Figure 2A:
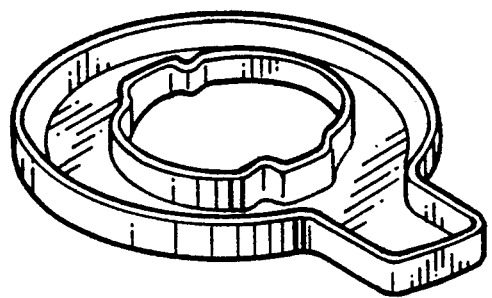
FIG. 2A shows a top perspective of the preferred embodiment of the clutch plate.

Clutch plate 2 construction is of durable material such as a hardened grade of steel with all edges formed to create a continuous lip entirely around the perimeter and central opening. Such edge is to provide straight sides for smooth operation as well as adding strength and reducing weight to the clutch plate FIG. 2A.

The central opening is formed to a size which assures clearance with the object passing through its center at all times. Within this opening are created projections positioned radially from the center of the opening to permit clearance with the circular bar used in this example. Such clearance is controlled so that tilting of the clutch plate on the bar causes it to lock in position on the bar when configured as illustrated in FIG. 1.

The outer surface consists of a lever projecting from an otherwise circular shape. Dimensions of the lever permit this feature of the clutch plate to be inserted through the large end of the housing such that the lever passes from the inside of the housing, through the opening in the side of the housing, to the outside of the housing. The circular portion of the clutch plate is of dimension to permit a clearance fit inside the housing when inserted as described, but is large enough for the side opposite the lever to make solid contact with the projection in the sidewall of the housing.

Figure 2B:
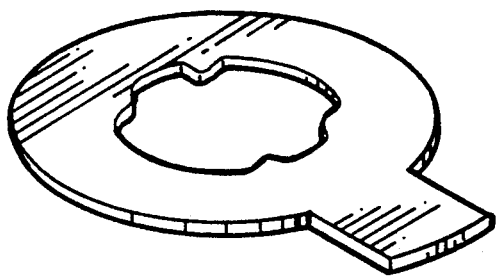
FIG. 2B is a top perspective of an alternate embodiment of the clutch plate.

Alternatively, the described clutch plate may be fabricated as a flat part FIG. 2B for applications in which the additional weight and rougher edges are appropriate.

Spring 3 provides continuous force on the clutch plate in all positions of its travel. When an object is present through the central opening of the clutch plate, the spring causes the collar to be locked on the object as a result of the tilting motion imparted to the clutch plate as the clutch plate is forced against the housing projection. The tilting reduces the radial distance between the projections in the central opening of the clutch plate causing it to lock against the central member.

Cap 4 is the circular closure for the previously described parts. The cap is made with an outer wall to engage the inside of the housing with a press fit or other means such as welding or adhesive bonding. Additionally, the central opening is formed in the same direction to create a surface to guide the bar passing through its center and to facilitate the resulting sliding contact.

Figure 3:
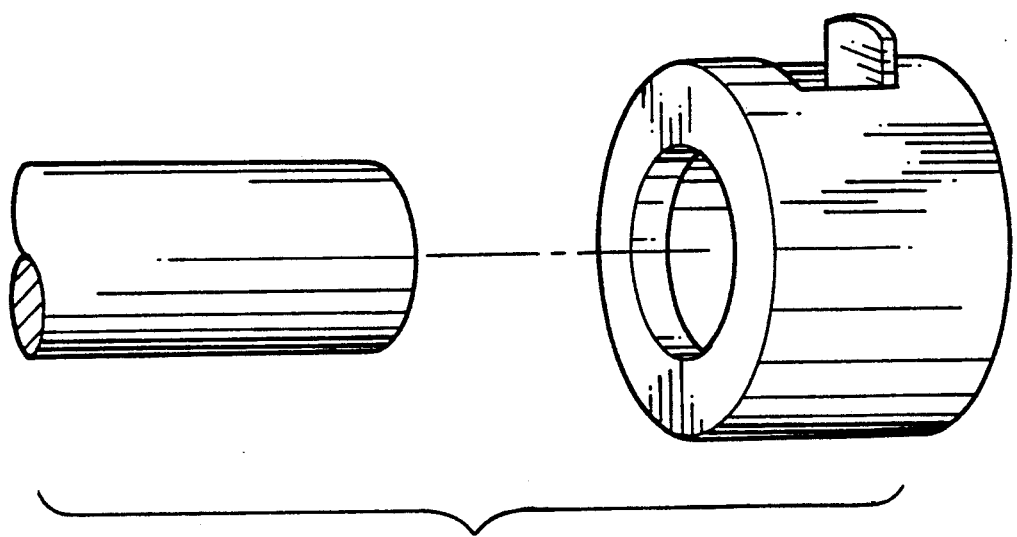
FIG. 3 is a top perspective of the assembled device and installation.

FIG. 3 depicts the collar with clutch lever in depressed position for installation on the shaft. Once on the shaft, the lever can be released. The collar can be moved to the left by hand with no further pressure on the clutch lever, but locks securely against attempts to move it to the right unless the clutch lever is again depressed.

Figure 4A:
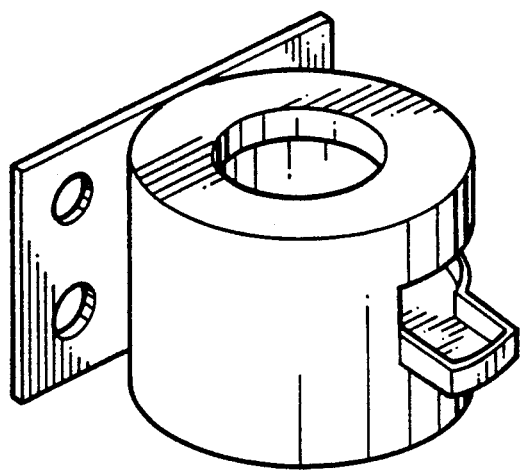
FIG. 4A shows a top perspective of side flange mounting for a locking collar.

FIG. 4A is a locking collar as described joined to a mounting flange to permit attachment to another object.

Figure 4B:
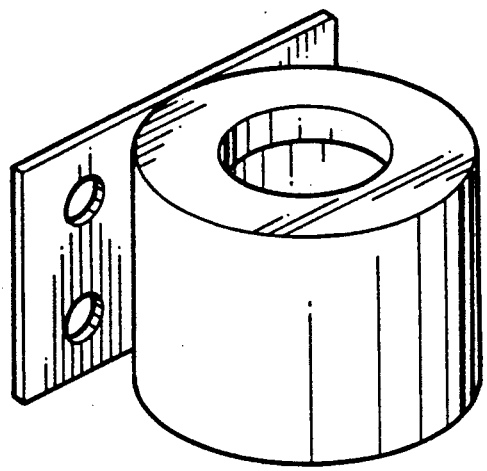
FIG. 4B shows a top perspective for a non-locking collar.

FIG. 4B is a collar made up of a housing, end cap and flange, but without the clutch plate and spring. The purpose of this non-locking collar is to provide a sliding fit with an object through its center.

Figure 4C:
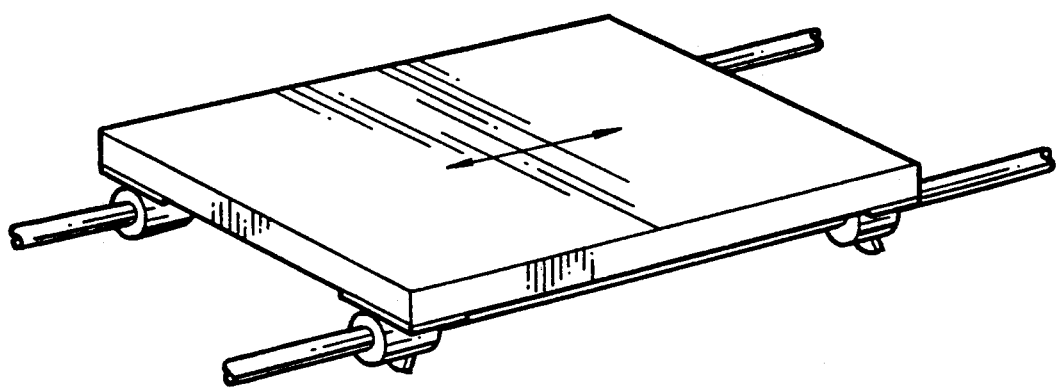
FIG. 4C is a top perspective of a work surface which can be moved and locked in position with locking and non-locking collars.

FIG. 4C illustrates how a work surface can be created using two locking collars mounted to function in opposite directions, and two non-locking collars as guides. Releasing the locking collars allows the surface to be re-positioned as desired. When locked, the locking collars hold the surface securely in position.

FIG. 5A shows a collar joined to a mounting flange on the end of the collar for attachment to another object.

FIG. 5B is a collar made up of a housing, end cap and flange, but without the clutch plate and spring. The purpose of this non-locking collar is to provide a sliding fit with an object through its center.

FIG. 5C illustrates how a shelf can be created using two locking collars mounted to operate in the same direction, and two non-locking collars as guides. Releasing the two locking collars allows the shelf to be re-positioned as desired. When locked, the locking collars hold the shelf securely in position.

The invention should of course not be considered restricted either to the fields of application described above or to the illustrated embodiment, but may be modified in various ways within the spirit and scope of the accompanying claims.

What I claim and desire to secure by Letters Patent is:

1. A device for gripping a shaft, having a longitudinal axis, inserted into the device, the device comprising:
   a housing;
   a clutch plate, mounted to the housing, having a central opening and a plurality of projections facing radially inward into the opening, such that the projections tend to grip the shaft when the plate is disposed at an oblique angle with respect to the longitudinal axis of the shaft but not when the plate is disposed perpendicularly with respect to such axis; and
   bias means for biasing the clutch plate at an oblique angle with respect to the shaft, and thus tending to cause the projections to grip the shaft.

2. A device according to claim 1, further comprising:
   release means for selectively overriding the bias means and for urging the clutch plate toward a position in which it is perpendicularly disposed with respect to the longitudinal axis of the shaft and thus releasing the grip of the projections on the shaft.

3. A device according to claim 1, wherein each projection is curved negatively in relation to the longitudinal axis of the shaft.

4. A device according to claim 3, wherein the absolute value of the radius of curvature of the projection is small compared to the radius of the shaft.

5. A device according to claim 1, further comprising:
   a mounting flange affixed to the housing for attaching the device to another object.

* * * * *